United States Patent [19]

Quinn et al.

[11] 4,042,874
[45] Aug. 16, 1977

[54] HIGH-VOLTAGE A.C. POWER SUPPLY WITH AUTOMATICALLY VARIABLE D.C. BIAS CURRENT

[75] Inventors: H. Quinn, Rancho Palos Verdes, Calif.; Nicholas M. Soures, Webster, N.Y.

[73] Assignee: Xerox Corporation, Stamford, Conn.

[21] Appl. No.: 617,132

[22] Filed: Sept. 26, 1975

[51] Int. Cl.$^2$ .................. H01T 19/00; H02M 7/515
[52] U.S. Cl. .................................... 323/4; 323/20; 323/22 T; 361/225; 363/134
[58] Field of Search ............... 250/324; 317/262 A; 321/2, 18, 19, 45 R; 323/4, 6, 7, 20, 21, 22 T, 24, 44 R, 62

[56] References Cited

U.S. PATENT DOCUMENTS

| | | | |
|---|---|---|---|
| 3,701,937 | 10/1972 | Combs | 321/2 |
| 3,702,434 | 11/1972 | Ryan | 321/2 X |
| 3,819,942 | 6/1974 | Hastwell et al. | 317/262 A |
| 3,887,861 | 6/1975 | Anzai et al. | 321/18 |
| 3,909,702 | 9/1975 | Hart | 323/20 X |

Primary Examiner—A. D. Pellinen
Attorney, Agent, or Firm—James J. Ralabate; Franklyn C. Weiss; Ronald L. Taylor

[57] ABSTRACT

A circuit for concurrently producing regulated high-voltage a.c. current and automatically varying d.c. current on one output line, where all adjustment and regulation is accomplished in low-voltage circuits, power supply being particularly useful as the power source for copier and duplicator corotrons. The basic wave shape is a rectangular wave which is amplified and regulated for application as the a.c. input to a corotron. The corotron itself is used as the rectifier for the d.c. bias current, and while the nominal d.c. bias is fixed by adjusting the duty cycle of the rectangular wave to a fixed value, the actual d.c. bias current will vary in accordance with atmospheric conditions and paper thickness, which is desirable for the proper operation of copier and duplicator corotrons. The adjusted duty cycle of the rectangular wave determines the nominal d.c. bias current. This is because the part of the corotron input wave shape which has the shorter duration must have the higher amplitude, and current in the corotron increases with voltage.

8 Claims, 3 Drawing Figures

HIGH-VOLTAGE A.C. POWER SUPPLY WITH AUTOMATICALLY VARIABLE D.C. BIAS CURRENT

BACKGROUND OF THE INVENTION

A. Field of the Invention

This invention relates to the design of power supplies and more specifically to power supplies for corotrons to be used in duplicating and copying equipment.

B. Description of the Prior Art

A typical copier or duplicator contains a photoreceptor surface implemented from semi-conducting material formed onto a rotating drum. The drum surface will typically be charged to a particular d.c. potential, and then light from an original printed or typed paper is allowed to fall on the drum discharging those areas of the drum corresponding to the white spaces on the paper. As the drum continues to revolve, the surface is rotated to a point where toner is dusted onto the drum. The toner will attach to the drum only at those points that are charged, thus forming a black-on-white image on the drum. Finally, this image is transferred electrostatically from the drum to a sheet of paper and fused thereon in a fusing process.

To accomplish this process a variety of corotrons are required. A corotron is a wire extending the axial length of the drum. It is outside of the drum and is surrounded on one side by the drum semi-conductor surface and on the other three sides by a channel. A.C. voltage in excess of three thousand volts is applied to the wire producing a corona between the wire and the channel. The presence of this alternating corona field will discharge the semi-conductor drum surface to a nominal zero volts. This variety of corotron is used to discharge the semiconductor drum surface prior to cleaning the excess toner from the drum after the image has been transferred to the paper.

Another variety of corotron is used to charge the semi-conductor drum surface, typically to 700 or 800 volts d.c., prior to exposing the image of the paper hard copy onto the drum.

Since each corotron requires a different d.c. component, it is typical that each corotron must have its own power supply. These power supplies typically comprise an a.c. source which is usually line voltage transformed to several thousand volts for application to the corotron in series with a regulated and adjustable d.c. power supply to supply the d.c. bias.

A problem with this variety of power supply is its high cost and relative lack of reliability since two separate power supplies must be provided, both of which contain regulation and adjustment circuits in their high-voltage lines. Furthermore, the cost of these power supplies is relatively high since a separate a.c. and d.c. power supply must be constructed, and these power supplies must have a large number of high-voltage parts.

A further problem is that the corotron is itself a rectifier. More specifically, a corotron will be created and conduction will begin when the corotron wire has an instantaneous potential of three thousand volts negative while a corona and conduction will not start until the central wire has about three thousand, two hundred volts of instantaneous potential in a positive direction. This is a result of the phenomenon that electrons will leave a sharp surface more readily than a flat surface.

It is because of this rectification by the corotron, and the resulting net d.c. bias on the corotron wire when high alternating voltages are applied that a d.c. series power supply must be supplied in a corotron power supply even when a net zero d.c. bias is required for the corotron's proper operation. It is therefore required of a corotron power supply that it has an adjustable d.c. series power supply even if a zero volt bias is required.

A further complication arises in the operation of a copier corotron since the amount of d.c. bias current required may vary depending on atmospheric humidity and pressure and paper thickness even while the a.c. current must remain constant. For this application, the a.c. current must be adjustable and regulated by a closed loop regulator circuit while the d.c. bias generating circuit must vary in accordance with operating conditions.

It can therefore be seen that there is a need in the copier industry for a corotron power supply which can simultaneously supply regulated and adjustable high-voltage a.c. current and variable d.c. current. It would be desirable for these two power supplies to be integrated into a single circuit; and it would reduce cost and increase reliability if the adjustment and regulation of these voltages could be done at a low-voltage level.

SUMMARY OF THE INVENTION

This invention is unique in that it uses the corotron itself as a rectifying element to produce either a positive or negative d.c. bias. This is done by using a rectangular wave instead of a sine wave to generate the high-voltage alternating current, and by adjusting the duty cycle of this rectangular wave to produce a variable d.c. current which will automatically vary above or below its nominal adjusted value depending on operating conditions.

These results are possible because of the following characteristics of transformers and corotrons in general.

With regard to a transformer, it is universally true that if one end of a transformer secondary is grounded, the average voltage at the other end of the secondary will by zero; that is, the sum of all of the instantaneous positive and negative voltages will be zero. In the usual case, a symmetrical sine wave or square wave is applied to the primary of a transformer and the secondary positive and negative voltages will be identical. However, if the average must identically equal zero volts, then it is clear that at the secondary, that polarity being produced for a shorter amount of time must be produced at a higher voltage. For example, if the output from a secondary winding is positive for a shorter amount of time and negative for a longer amount of time, then the maximum instantaneous positive voltage will exceed the maximum instantaneous negative voltage.

When a corotron receives this unsymmetrical rectangular wave at its central wire, it will conduct in both directions but it will conduct more heavily when the positive voltage is being applied to the wire since the positive voltage is greater and corona current increases faster than voltage. Therefore, there will be a net d.c. bias current in a positive direction. However, as stated earlier, since the corotron conducts more heavily when the central wire is negative, there will also be a negative bias on the corotron, and if the circuit is adjusted properly, these positive and negative biases will cancel.

If the amount of dissymmetry is adjustable, then the d.c. bias can be varied from a positive to a negative level, either exactly overcoming the corotrons's initial bias, or providing any positive or negative bias required of the corotron in its particular use in the copying equipment.

Furthermore, it has been found through experimental use that if the a.c. current is adjustable and regulated, and if the rectangular wave duty cycle is adjusted to produce the correct nominal d.c. current, but is not regulated by means of a closed loop, then the natural variations induced by atmospheric conditions and paper thickness improve the copier's ability to operate under these varying conditions.

Thus, one advantage of this circuit is that a single power supply produces both a.c. and d.c. currents required by the corotron thus reducing the cost of manufacturing this unit. An additional advantage of this circuit, as will be described hereinbelow, is that all regulation occurs at a low-voltage level, increasing the reliability of the circuit as well as decreasing the cost of manufacture. Finally, this circuit can be used to advantage in a copier or duplicator corotron where the normal variations in d.c. current are exactly as required for proper operation.

This power supply design is being discussed in relation to a copier or duplicator corotron in that it is one use to which this type of power supply can be put. However, this power supply can be used to advantage, because of the increased reliability and decreased cost considerations mentioned above, in any environment where a rectifying load requires a high-voltage a.c. current and a d.c. bias current.

DETAILED DESCRIPTION OF THE PREFERRED EMBODIMENT

Figure 1:
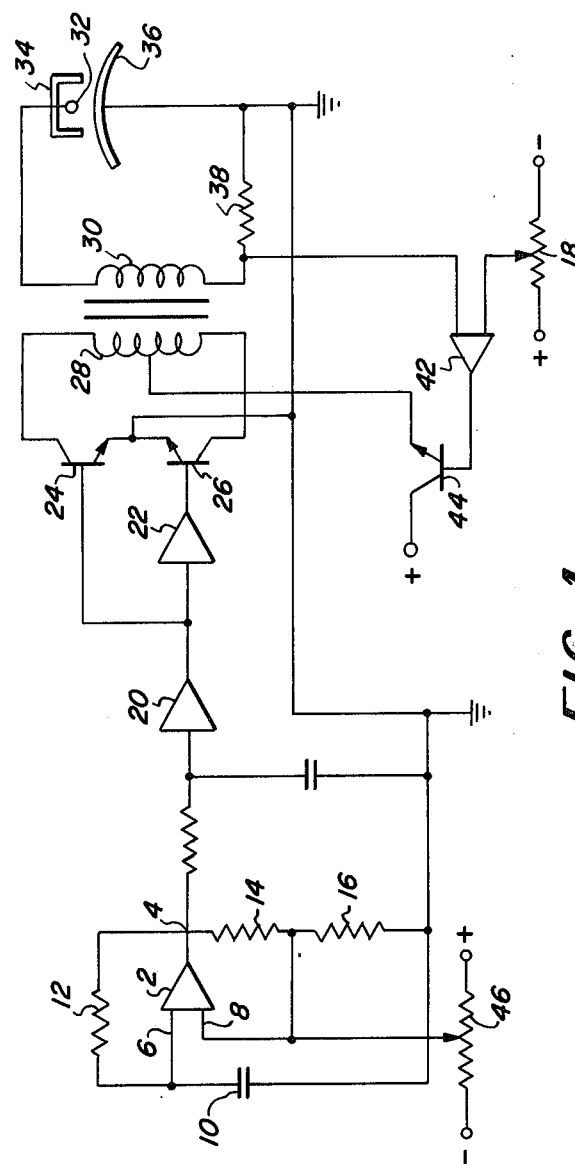
FIG. 1 is a simplified schematic of the power supply.
Figure 2:
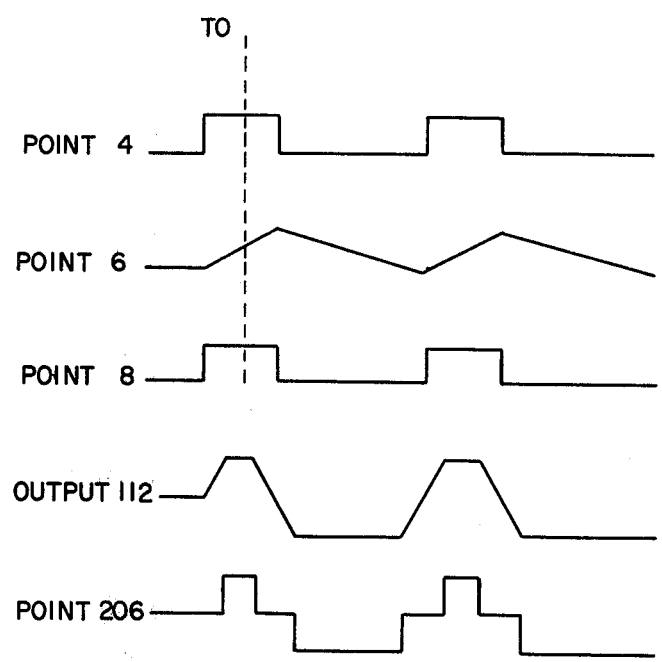
FIG. 2 shows the timing relationships of the various wave shapes.

The preferred embodiment of this invention comprises a non-symmetrical rectangular wave generator to supply current to a high-voltage transformer primary, the secondary of which is connected to a corotron or some other non-linear a.c. load, and may be conveniently discussed in relation to the simplified schematic diagram shown in FIG. 1 and the idealized wave shapes shown in FIG. 2.

Operational Amplifier (Op Amp) 2 generates the non-symmetrical rectangular wave as follows.

Point 6 is the Inverting Input to the Op Amp 2 and Point 8 is the Non-Inverting Input. The Output of the Op Amp is supplied to Point 4. If at a point in time T0, the voltage at the Inverting Input 6 is negative of the voltage at the Non-Inverting Input Point 8 then the voltage at the Output 4 will be maximum positive. This voltage will be felt through voltage divider Resistors 14 and 16 to Point 8 immediately, but will be felt at Point 6 slowly because of the time constant produced by Resistor 12 and Capacitor 10. The voltage at Point 6 will build slowly because of this time constant until it becomes more positive than the voltage at Point 8, at which point the Op Amp 2 will switch, driving the voltage at Point 4 negative. Again, this negative voltage will be felt immediately at Point 8 but will not be felt immediately at Point 6 because of the resistive capacitive time constant.

Because of Adjustment Resistor 46 the points of reversal in the wave shape shown as Points 4, 6 and 8 of FIG. 2 can be adjustable. For instance, if the switching point is set at some positive voltage, and assuming that the output of Op Amp 2 varies between an identical positive and negative d.c. voltage, then it can be seen that because of a smaller differential voltage, Capacitor 10 will charge in a positive direction slower than it will in a negative direction. This would result in the wave shapes shown in FIG. 2 where the output of Op Amp 4 would be negative for a longer time than it would be positive.

The resultant rectangular wave is amplified in Op Amp 20, inverted in Op Amp 22 and applied to an audio push-pull amplifier comprising Transistors 24 and 26. These push-pull amplifiers drive center tapped Transformer Primary 28 and the output from Secondary 30 is applied to the Corotron Wire 32. A wave shape resembling the Point 4 wave shape in FIG. 2 will be applied to the Corotron at an a.c. voltage of approximately four thousand volts. However, because of the non-symmetry of this wave shape and because of the fact that the output of a transformer secondary will average zero, the positive instantaneous voltage applied to the Corotron wire will exceed the negative voltage applied to the corotron wire by a significant amount. Instantaneous application of more than three thousand volts negative or three thousand, two hundred volts positive on the Corotron Wire with respect to the Corotron Channel 34, which is held at ground potential, will result in a corona between the Wire 32 and the Channel 34 which will be felt by the semi-conductor Drum Surface 36. As described above, the Corotron has a rectifying effect which will produce a d.c. bias in the Corotron. The wave shapes shown in FIG. 2 will result in increased conduction when the corotron wire is positive in compensation for the normal amount of negative current found in the Corotron. The result is that by the adjustment of Resistor 46, the total bias current can be maintained at zero or any positive or negative value.

The low end of Transformer Secondary 30 is connected through Sensing Resistor 38 to ground. This Sensing Resistor voltage is an indication of the a.c. current flowing in the circuit, and is compared to a reference supplied by Adjustable Resistor 18 to Op Amp 42. The resulting correction voltage is supplied to Transistor 44 which supplies d.c. voltage through the center top of Transformer Primary 28 to the audio amplifier Transistor 24 and 26, thus regulating the a.c. current level.

Figure 3:
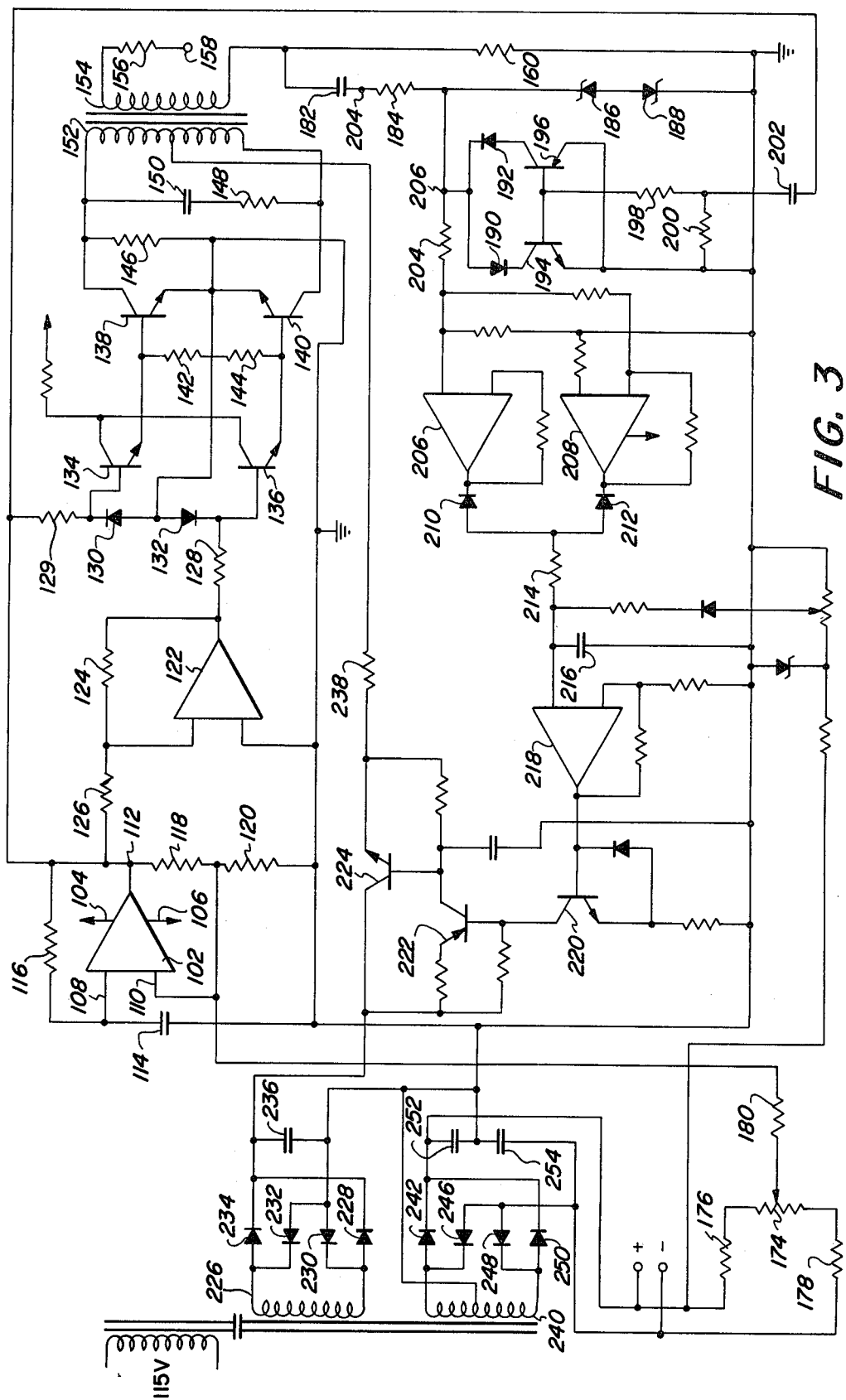
FIG. 3 is a detailed schematic of the power supply.

FIG. 3 is a detailed schematic of the Power Supply. Op Amp 102 is used to generate the basic rectangular wave shape. It receives a nominal plus and minus 12 volts at the Power Input Pins 104 and 106, and is supplied with an Inverting Input 108, a Non-Inverting Input 110, and an Output 112. The RC circuit comprising Capacitor 114 and Resistor 116 determine the duty cycle of the rectangular wave in conjunction with Resistors 118 and 120. The common point between Resistors 118 and 120 is tied to the Non-Inverting Input of Op Amp 102 and also receives a d.c. Adjustment voltage which will be discussed below. This Adjustment voltage may go above or below zero and determines the switching point of the Operational Amplifier.

Because the output of the Op Amp is switching between plus and minus 12 volts, it is clear that when the output is at minus 12 volts and the Inverting Input Point 108 is switching at a positive voltage there is more voltage across Resistor 116 than there would be if the switching point were positive. Thus it can be seen that for a negative switching point the current flowing through Resistor 116 will be less for a negative output and greater for a positive output. The result of this decreased current when the output is negative and an increased current when the Output is positive would result in the positive output at Point 112 being shorter in duration than the negative output. Thus it can be seen that the adjustment voltage applied at the Non-Inverting Input Point 110, in conjunction with the voltage divider Resistors 118 and 120, determines the percentage of total time that the Operational Amplifier will be switched positive as opposed to the time it will be switched negative.

This output at Point 112 is transmitted to Operational Amplifier 122 which, along with Resistors 124 and 126, implements a simple amplification circuit. The rectangular wave output is then transmitted through Resistors 128 and 129 to a typical push/pull audio amplifier comprising Diodes 130 and 132, Transistors 134, 136, 138, and 140, Resistors 142, 144, 146, and 148, and Capacitor 150. This audio amplifier arrangement drives the center tapped Transformer Primary 152 which receives its positive d.c. voltage at the center tap. The non-symmetrical rectangular wave is developed at the Secondary 154 and is applied through Resistor 156 to the Corotron Wire 158.

The original symmetry of the rectangular wave may be adjusted by Variable Resistor 174 which is connected to sources of positive and negative voltage through Resistors 176 and 178. This adjustment voltage is applied through Resistor 180 to Op Amp Input 110, varying the switching point of said Op Amp, and thus varying the duty cycle as described hereinabove.

Because the variation in symmetry may affect the amplitude of the a.c. voltage being applied to the Corotron, a separate a.c. voltage regulation circuit is provided. In this case, the Sensing Resistor 160 voltage which has not been filtered is applied through Capacitor 182 and Resistor 184 to back-to-back Zener Diodes 186 and 188. These Zener Diodes are simply a safety device to prevent large amplitude spurious signals from damaging the remainder of the regulation circuit.

The network comprising Diodes 190 and 192, Transistors 194 and 196, Resistors 198 and 200, and Capacitor 202 comprise a circuit for clamping the output from the Sensing Resistor to ground during periods when that output is varying and to unclamp the output from the Sensing Resistor during periods when the output of the Sensing Resistor is stable. What this amounts to as shown in FIG. 2, is an input from the square wave generator Op Amp 102 Output 112 through a differentiation network comprising Capacitor 202 and Resistor 200. The output of this differentiation network will be positive for rising wave shapes, negative for falling wave shapes, and zero for stable wave shapes. If the wave shape at the output of the differentiation network is positive, Transistor 194 will conduct, clamping Point 206 to ground. Only when the output of the rectangular wave generator is in a stable positive or negative condition will the output of the differentiation circuit be zero allowing neither Transistor 194 nor 196 to conduct and therefore allowing the rectangular wave shape, which will be at its maximum positive or negative value, to continue through Resistor 204 into either Operational Amplifier 206 or 208. These wave shapes are shown in FIG. 2.

Op Amp 206 is implemented as a non-inverting amplifier and Operational Amplifier 208 is an inverting amplifier. In conjunction with Diodes 210 and 212, the output applied to Resistor 214 will be a negative amplitude of the rectangular wave. This output is averaged by means of the R.C. circuit comprising Resistor 214 and Capacitor 216 and is applied to Operational Amplifier 218, configured as an amplifier, and through Transistors 220 and 222 to either increase or decrease the amount of current through Transistor 224.

Transistor 224 connects the high-voltage Primary Transformer 152 center tap to the high-voltage d.c. power supply. This high-voltage power supply is implemented in the form of a full-wave solid state rectifier comprising Transformer Secondary 226, four Diodes 228 through 234 configured as a bridge type full-wave rectifier and Capacitor 236 which provides filtering for the output d.c. voltage.

Power Transistor 224 allows more or less of this d.c. current to pass through Resistor 238 to the center tap of the a.c. Transformer Primary which, in turn, supplies a greater amount of power to the push/pull audio amplifier Transistors 138 and 140 and therefore results in a higher a.c. voltage applied to the Corotron at Point 158. Thus the a.c. high voltage is adjustable and regulated in this power supply.

A second bridge-type rectifier comprising Transformer Secondary 240, Diodes 242 through 250 and Capacitors 252 and 254 comprise a source of both positive and negative d.c. voltage for the Adjustable Resistor 174 which is used in the symmetry adjustment circuit.

The circuit as shown in FIG. 3 accomplishes the objectives of this invention in that a single power supply is used to produce both regulated a.c. and variable d.c. voltages applied to the Corotron, with the regulation and adjustment being accomplished at a low voltage. As can be seen from the schematic in FIG. 3 the entire set of generating, sensing and regulating functions are implemented in circuits operating at less than 12-volt d.c. levels, thus providing a low-cost and reliable Corotron power supply.

The described preferred embodiment has been used in connection with a Corotron but this power supply could also be used with any non-linear load requiring high a.c. and low bias d.c. voltages. Likewise, a specific circuit has been shown for developing a variable bias d.c. current by adjusting the symmetry of the a.c. wave shape but it is contemplated that any equivalent circuit for using an adjustment wave shape symmetry to adjust a d.c. bias current could by used in connection with this invention.

While a particular embodiment of the present invention has been described and illustrated, it will be apparent to those skilled in the art that changes and modifications may be made therein without departure from the spirit and scope of the invention as claimed.

What is claimed is:

1. An a.c. and d.c. power supply for driving a non-linear load in which current over the operating voltage range increases faster or slower than applied voltage comprising:
generating means for generating an a.c. waveshape,
a transformer for coupling said a.c. waveshape from said generating means to said load such that the sum of all instantaneous positive and negative a.c. voltages at said load will be approximately zero, and
d.c. adjustment means coupled to said generating means for adjusting the symmetry of said a.c. waveshape so that the d.c. current through said load will vary under operating conditions in accordance with a predetermined plan.

2. The apparatus of claim 1 wherein said a.c. waveshape is substantially rectangular.

3. The apparatus of claim 1 wherein said load is a corotron.

4. The apparatus of claim 3 wherein said generating means comprises:
a rectangular wave generator, and
amplifier means for amplifying said rectangular wave, and for coupling said rectangular wave to said transformer.

5. The apparatus of claim 4 further comprising:
a.c. feedback means for sensing the a.c. voltage at said load, and for producing and coupling to said amplifier means a correction signal to vary the amplification of said amplifier means to regulate said a.c. voltage to a pre-determined level.

6. The apparatus of claim 5 wherein said pre-determined a.c. voltage level is adjustable.

7. An a.c. and d.c. power supply for driving a non-linear load in which current over the operating range increases faster or slower than applied voltage comprising:
a rectangular wave generator for generating a substantially rectangular wave,
a push-pull amplifier for amplifying said waveshape,
a transformer for receiving the ouput of said amplifier at the ends of said transformer primary and for coupling said output to said load such that the sum of all instantaneous positive and negative a.c. voltages at said load will be approximately zero,
a d.c. power source coupled to the center tap of said transformer primary, and
d.c. adjustment means coupled to said generating means for adjusting the symmetry of said wave, so that the d.c. current through said load will vary under operating conditions in accordance with a pre-determined plan.

8. The apparatus of claim 7 further comprising a.c. feedback means for comparing the a.c. current at said load against an adjustable reference, and for producing and coupling to said d.c. power source a correction signal to vary the d.c. power and therefore the amplification of said amplifier to regulate said a.c. current to a pre-determined level.

* * * * *